US012749615B2

(12) United States Patent
Kumagai et al.

(10) Patent No.: US 12,749,615 B2
(45) Date of Patent: Sep. 29, 2026

(54) FLAT COIL AND COIL DEVICE

(71) Applicant: TDK CORPORATION, Tokyo (JP)

(72) Inventors: Masaru Kumagai, Tokyo (JP); Shinichiro Kokubo, Tokyo (JP); Ge Li, Tokyo (JP)

(73) Assignee: TDK CORPORATION, Tokyo (JP)

( * ) Notice: Subject to any disclaimer, the term of this patent is extended or adjusted under 35 U.S.C. 154(b) by 463 days.

(21) Appl. No.: 18/480,547

(22) Filed: Oct. 4, 2023

(65) Prior Publication Data

US 2024/0120147 A1 Apr. 11, 2024

(30) Foreign Application Priority Data

Oct. 7, 2022 (JP) ................................ 2022-162670

(51) Int. Cl.

| | |
|---|---|
| ***H02H 7/00*** | (2006.01) |
| ***H01F 27/28*** | (2006.01) |
| ***H01F 27/30*** | (2006.01) |
| ***H01F 27/32*** | (2006.01) |

(52) U.S. Cl.

CPC ....... *H01F 27/325* (2013.01); *H01F 27/2823* (2013.01); *H01F 27/306* (2013.01)

(58) Field of Classification Search

CPC ..................................................... H01F 27/325

See application file for complete search history.

(56) References Cited

U.S. PATENT DOCUMENTS

| | | | | |
|---|---|---|---|---|
| 7,545,336 B2 * | 6/2009 | Naito | H01Q 7/08 | 343/788 |
| 2014/0147260 A1 * | 5/2014 | Hu | F04D 25/0646 | 415/191 |
| 2015/0130577 A1 * | 5/2015 | Hongzhong | H01F 41/122 | 29/605 |
| 2018/0358162 A1 | 12/2018 | Huang et al. | | |
| 2021/0043357 A1 | 2/2021 | Huang et al. | | |
| 2023/0290562 A1 * | 9/2023 | Kumagai | H01F 27/2847 | |

FOREIGN PATENT DOCUMENTS

| | | |
|---|---|---|
| CN | 108428539 A | 8/2018 |
| JP | H05-166646 A | 7/1993 |
| JP | 2003-017334 A | 1/2003 |
| JP | 2007-221919 A | 8/2007 |
| JP | 2018-133456 A | 8/2018 |
| JP | 2019-114577 A | 7/2019 |

OTHER PUBLICATIONS

English Translation of Feb. 3, 2026 Office Action issued in Japanese Application No. 2022-162670.
Translation of Aug. 1, 2026 Office Action issued in Chinese Application No. 202311287838.9.

* cited by examiner

*Primary Examiner* — Stephen W Jackson
(74) *Attorney, Agent, or Firm* — Oliff PLC

(57) ABSTRACT

A flat coil comprises a coil main portion having a flat shape; a lead portion drawn out from the coil main portion; and a heat-dissipating portion provided to the coil main portion at a location different from where the lead portion is drawn out from the coil main portion, the heat-dissipating portion meeting the coil main portion at a predetermined angle.

14 Claims, 13 Drawing Sheets

FLAT COIL AND COIL DEVICE

TECHNICAL FIELD

The present invention relates to a flat coil and a coil device.

BACKGROUND

As a transformer for use involving a large current and a large output, known is a coil device including a flat coil (Patent Document 1).

Unfortunately, in the transformer disclosed in Patent Document 1, heat generated particularly at a higher voltage side is accumulated when a larger current is applied.

Patent Document 1: JP Patent Application Laid Open No. 2003-17334

SUMMARY

The present invention has been achieved under such circumstances. It is an object of the invention to provide a flat coil having excellent heat dissipating ability and a coil device having excellent heat dissipating ability.

To achieve the above object, a flat coil according to the present invention comprises a coil main portion having a flat shape, a lead portion drawn out from the coil main portion, and a heat-dissipating portion provided to the coil main portion at a location different from where the lead portion is drawn out from the coil main portion, the heat-dissipating portion meeting the coil main portion at a predetermined angle.

This structure enables heat generated at the flat coil to be dissipated via the heat-dissipating portion, improving heat dissipating ability of the flat coil.

To achieve the above object, a coil device according to the present invention comprises the above-mentioned flat coil, a case accommodating the flat coil, and a heat-dissipating resin in the case.

In this coil device, the flat coil is covered by the case and is immersed in the heat-dissipating resin. Thus, heat generated at the flat coil is readily transferred from the heat-dissipating portion to the case via the heat-dissipating resin. As heat is then dissipated outside via the case, heat dissipating ability of the coil device is improved. Note that the case may be made from metal, resin, or a composite material including metal and resin. An insulating case (e.g., a case made from resin) may be disposed in contact with the flat coil, and heat may be dissipated directly from the heat-dissipating portion to the case.

The coil device may comprise a bobbin provided with the flat coil and a core disposed along an axis of the flat coil, and the case may have an opening at a side of the case.

Despite the coil device including the core, heat generated at the core can be dissipated outside the case. Other than the flat coil, for example, a wire can be provided for the bobbin of the coil device.

When the case has the opening at the side of the case, the lead portion can be drawn out outside the case from the lateral side of the case through the opening, and a need for drawing out the lead portion outside the case from an upper part of the case is eliminated. Consequently, a need for an upper part of the bobbin to protrude outwards from the case for the purpose of positioning or the like is eliminated, which can reduce the height of the bobbin by the amount of the eliminated protrusion. Thus, the height of the coil device can be reduced.

The coil device may comprise a bobbin provided with the flat coil and a core disposed along an axis of the flat coil, and the case may have an opening at a top of the case.

The heat-dissipating portion may be disposed opposite the lead portion, with the coil main portion therebetween.

This structure enables heat generated at the flat coil to be more effectively dissipated outside the coil device.

The heat-dissipating portion may be disposed along a side wall of the case and apart from the side wall.

As the heat-dissipating portion is disposed along the side wall of the case, heat is more readily transferred from the heat-dissipating portion to the case via the heat-dissipating resin.

Preferably, the heat-dissipating resin is in contact with the case and the heat-dissipating portion.

This structure enables heat generated at the flat coil to be readily transferred from the heat-dissipating portion to the case via the heat-dissipating resin.

The flat coil may comprise a first flat coil including the heat-dissipating portion and a second flat coil connected to a lead portion of the first flat coil. A coil main portion of the second flat coil may be disposed to face a coil main portion of the first flat coil, with a distance therebetween.

This structure enables a wire or the like to be disposed between the first flat coil and the second flat coil. Thus, the coupling coefficient between the flat coil and a winding type coil made of the wire can be increased, and heat generated at these coils can be efficiently dissipated.

The heat-dissipating portion of the first flat coil may comprise an end that is closer to a lower wall of the case than is the coil main portion of the second flat coil.

As the end of the heat-dissipating portion is close to the lower wall of the case, heat generated at the first flat coil (farther from the bottom of the case), which readily reaches a higher temperature, can be efficiently dissipated from the heat-dissipating portion to the lower wall via the heat-dissipating resin. For example, when the coil device is mounted on a substrate equipped with a cooling system so that the lower wall is in contact with the substrate, heat can be particularly efficiently dissipated from the coil device.

The bobbin may comprise a protrusion enabling the heat-dissipating portion to be apart from the side wall of the case.

The bobbin may comprise a notch where the heat-dissipating portion is disposed.

The protrusion can ensure insulation between the heat-dissipating portion and the side wall. As the heat-dissipating portion is disposed in the notch, a short circuit between the heat-dissipating portion and the case can more effectively be prevented. As the heat-dissipating portion is disposed close to the side wall while insulation between the heat-dissipating portion and the side wall is ensured in this manner, heat can be more efficiently dissipated from the heat-dissipating portion to the side wall.

The bobbin may comprise an extending portion partly exposed from the heat-dissipating resin.

For example, when the wire is wound around the bobbin of this coil device, the wire can be drawn out in a desired direction while being anchored to the extending portion of the bobbin.

The coil device may comprise a heat-dissipating block attached near the flat coil via an insulating wall. The insulating wall may comprise a flange of the bobbin.

This structure enables heat to be more efficiently dissipated from the flat coil.

BRIEF DESCRIPTION OF THE DRAWING(S)

DETAILED DESCRIPTION

Hereinafter, embodiments of the present invention are described with reference to the drawings. Although the embodiments are described with reference to the drawings as necessary, the illustrations are only schematically and exemplarily provided for understanding of the present invention, and the appearance, dimensional ratios, etc. may be different from the actual ones. Hereinafter, the present invention is specifically described based on the embodiments, but the present invention is not limited to these embodiments.

First Embodiment

Figure 1:
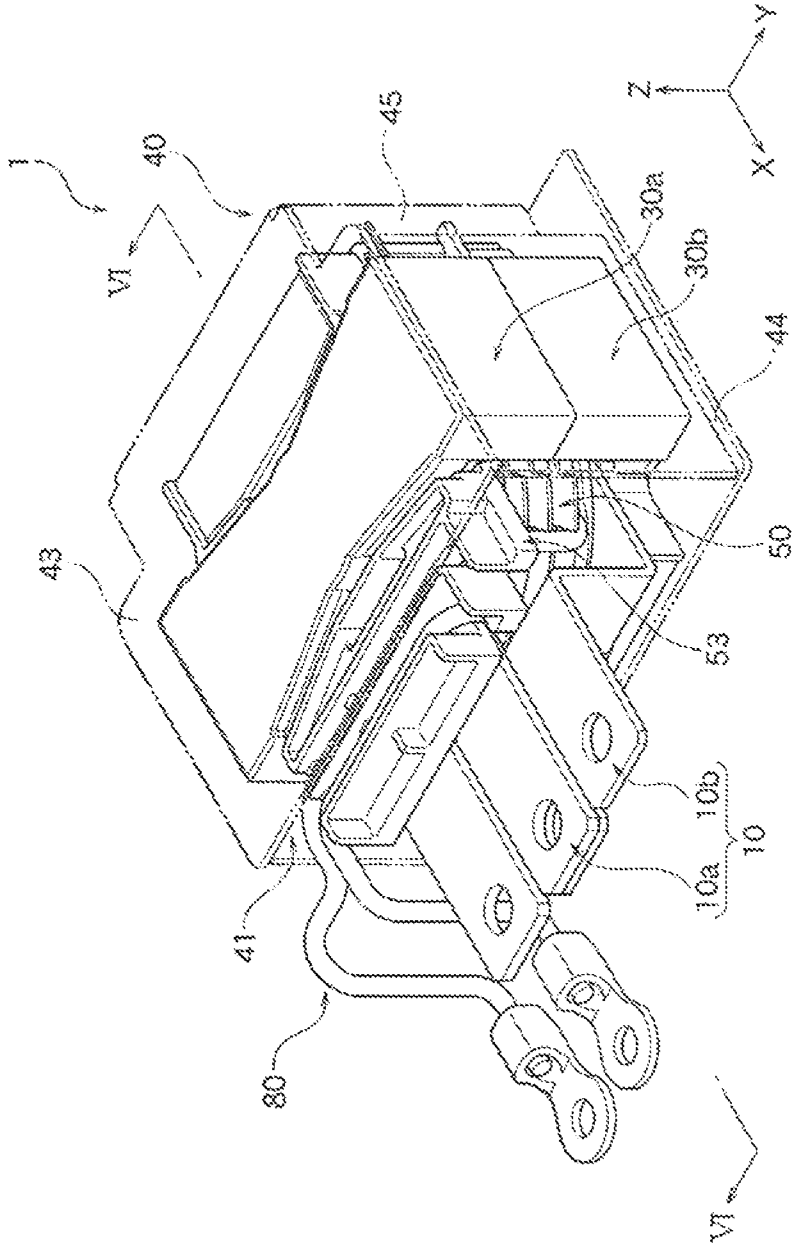
FIG. 1 is an overall perspective view of a coil device according to an embodiment.
Figure 2:
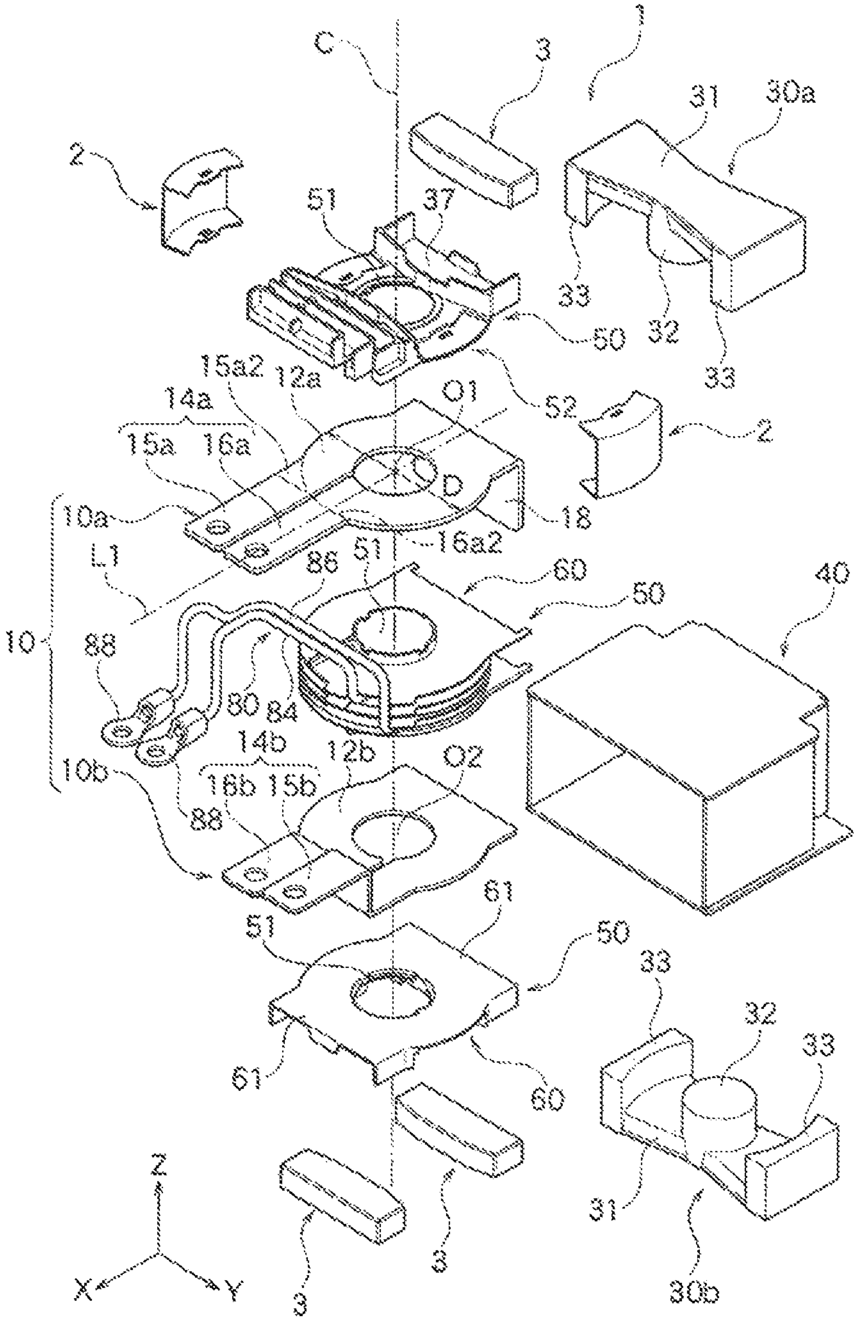
FIG. 2 is an exploded perspective view of the coil device shown in FIG. 1.

Hereinafter, a coil device 1 shown in FIG. 1 is described in detail. The coil device 1 functions as, for example, a transformer. The coil device 1 can be included in electronic equipment to which a high voltage is applied, such as an on-board charger, a power supply circuit of electronic equipment for home or industrial use, and a power supply circuit of computer equipment. FIG. 2 is an exploded perspective view of the coil device 1 shown in FIG. 1. As shown in FIG. 2, the coil device 1 includes a flat coil 10 and a case 40 accommodating the flat coil 10. The coil device 1 may have any size.

A relatively high current can be applied to the flat coil 10. The flat coil 10 includes a first flat coil 10*a*. The first flat coil 10*a* may be made from any material. For example, the first flat coil 10*a* is made from a conductor, such as copper, a copper alloy, brass, and steel. The first flat coil 10*a* may be composed of a flat plate having a substantially constant thickness.

The first flat coil 10*a* includes a coil main portion 12*a* having an axis C penetrating a center O1 of the coil main portion 12*a* as its axis and a lead portion 14*a* drawn out from the coil main portion 12*a*. In the drawings, the X-axis, the Y-axis, and the Z-axis are perpendicular to each other. The Z-axis corresponds to the axis C of the flat coil 10. The X-axis is perpendicular to the axis C and corresponds to a direction in which the lead portion 14*a* extends, viewed from the axis C.

The coil main portion 12*a* has a substantial C-shape wound one turn around the axis C. The coil main portion 12*a* is a flat plate extending along an XY plane. The lead portion 14*a* is disposed on the same plane on which the coil main portion 12*a* is disposed.

As shown in FIG. 2, the lead portion 14*a* includes an intermediate lead portion 16*a* and an edge lead portion 15*a*. The intermediate lead portion 16*a* is drawn out from the coil main portion 12*a* at a draw-out location 16*a*2 disposed at one side of the coil main portion 12*a* in the X-axis direction. The intermediate lead portion 16*a* is disposed on a center line L1 passing through the center O1 of the coil main portion 12*a* and extending along the X-axis. The intermediate lead portion 16*a* has a connection hole 16*a*1.

The edge lead portion 15*a* is drawn out from the coil main portion 12*a* at a draw-out location 15*a*2 disposed at the one side of the coil main portion 12*a* in the X-axis direction. The edge lead portion 15*a* is shifted in the Y-axis direction from the center line L1. The edge lead portion 15*a* has a connection hole 15*a*1. The connection hole may be used for connection with, for example, a substrate.

Figure 7:
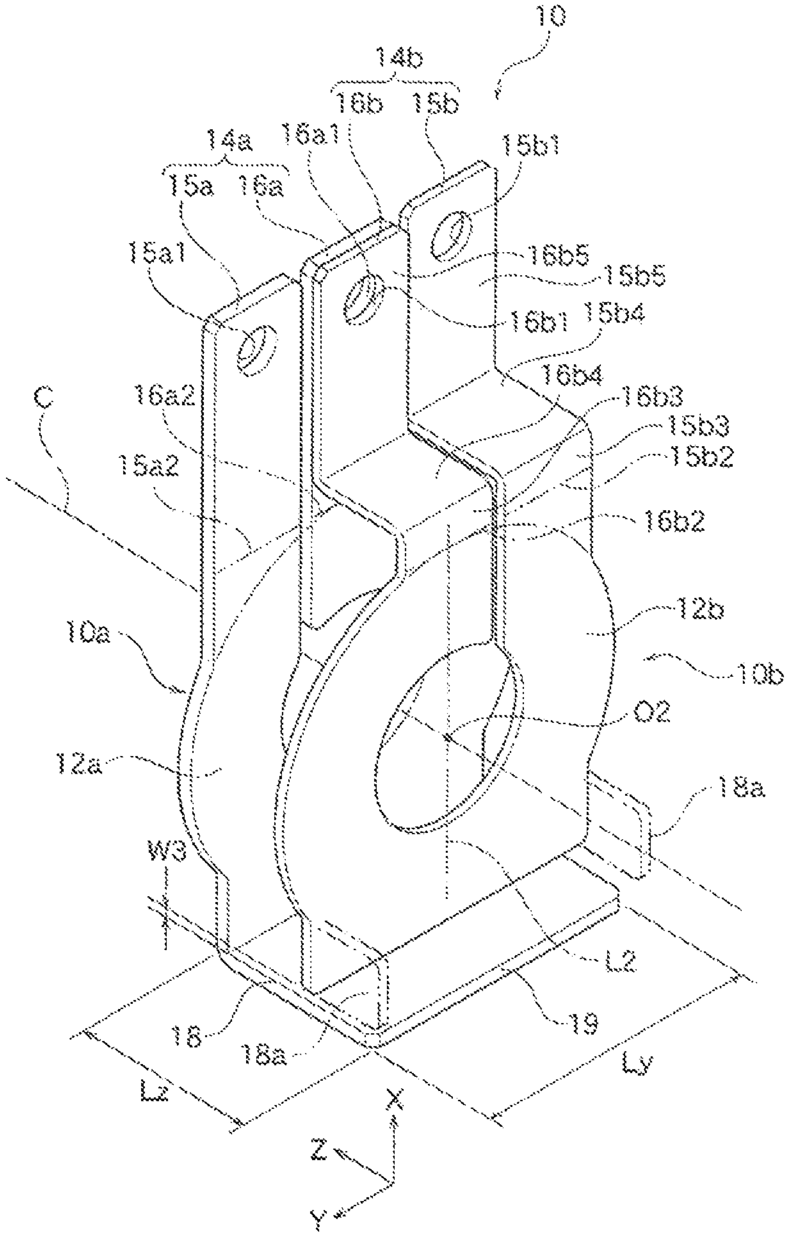
FIG. 7 is a perspective view of a flat coil shown in FIG. 2.

As shown in FIG. 7, the first flat coil 10*a* includes a heat-dissipating portion 18 connected to the coil main portion 12*a*. The heat-dissipating portion 18 is a heat-dissipating plate having a flat shape and can be formed by bending the coil main portion 12*a*. However, the heat-dissipating portion 18 may be formed independently and be provided for the coil main portion 12*a* by, for example, welding. Also, the heat-dissipating portion 18 may be divided into strips.

As shown in FIG. 7, the heat-dissipating portion 18 has a flat surface along the Z-axis direction and is disposed substantially perpendicular to the coil main portion 12*a*. The heat-dissipating portion 18 meets the coil main portion 12*a* at a predetermined angle and may be disposed so as to be inclined at an obtuse angle or an acute angle relative to the coil main portion 12*a*.

Figure 5:
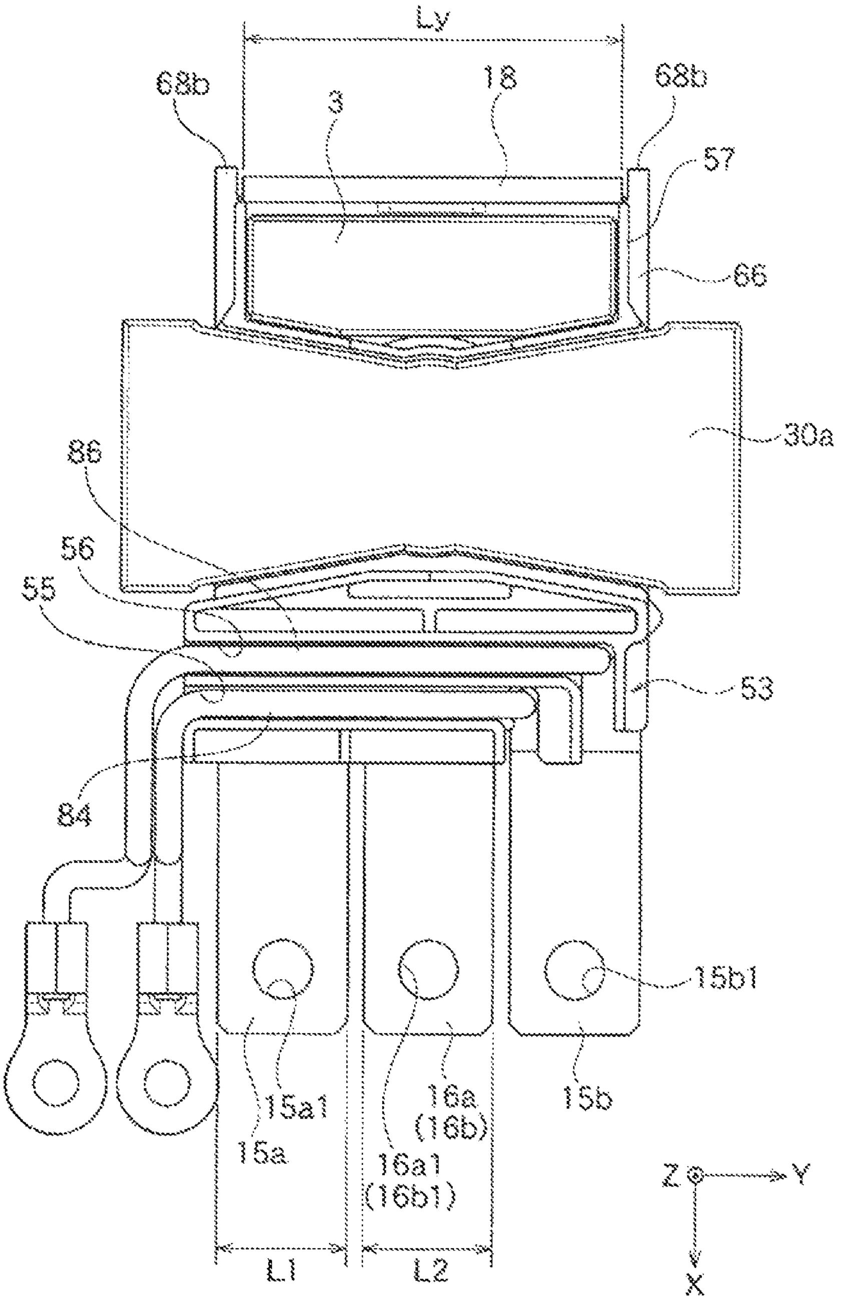
FIG. 5 is a partial plan view of the coil device shown in FIG. 1.

The size and the shape of the heat-dissipating portion 18 may be determined from the viewpoint of whether the size of the coil device 1 is acceptable and improving its heat dissipation ability. The heat-dissipating portion 18 may have any width Ly along the Y-axis direction and any length Lz along the Z-axis direction. The width Ly and the length Lz may be determined so that the heat-dissipating portion 18 has a large surface area. The width Ly of the heat-dissipating portion 18 may be larger than a width L1 of the edge lead portion 15*a* in the Y-axis direction and a width L2 of the intermediate lead portion 16*a* in the Y-axis direction, as shown in FIG. 5. Also, the width Ly of the heat-dissipating portion 18 may be smaller than a diameter D (width in the Y-axis direction) of the coil main portion 12*a* shown in FIG. 2 from the viewpoint of reducing the size of the coil device 1.

As shown in FIG. 2, the flat coil 10 may further include a second flat coil 10*b*. The second flat coil 10*b* is disposed below the first flat coil 10*a* in the Z-axis direction. The second flat coil 10*b* is not limited and may be made from the same material as the first flat coil 10*a*. However, the material is not necessarily the same. The second flat coil 10*b* may be composed of a flat plate having a substantially constant thickness. The thickness of the second flat coil 10*b* may be the same as that of the first flat coil 10*a* but may be different from that of the first flat coil 10*a*.

As shown in FIG. 7, the second flat coil 10*b* includes a coil main portion 12*b* and a lead portion 14*b* drawn out from the coil main portion 12*b*. The coil main portion 12*b* and the coil main portion 12*a* share the same axis C, and a center O2 of the coil main portion 12*b* is disposed on the axis C.

As shown in FIG. 7, the coil main portion 12*b* has a substantial C-shape wound one turn around the axis C. The coil main portion 12*b* is a flat plate extending along an XY plane. The coil main portion 12*b* is disposed to face the coil main portion 12*a* of the first flat coil 10*a* in a substantially parallel manner, with a distance therebetween in the Z-axis direction.

As shown in FIG. 7, the lead portion 14*b* includes an intermediate lead portion 16*b* and an edge lead portion 15*b*. The intermediate lead portion 16*b* is drawn out from the coil main portion 12*b* at a draw-out location 16*b*2 disposed at one side of the coil main portion 12*b* in the X-axis direction. The intermediate lead portion 16*b* is disposed on a center line L2 passing through the center O2 of the coil main portion 12*b* and extending along the X-axis.

As shown in FIG. 7, the intermediate lead portion 16*b* is bent in a crank shape. That is, the intermediate lead portion 16*b* includes a first portion 16*b*3 drawn out in the X-axis direction from the draw-out location 16*b*2, a second portion 16*b*4 extending upwards in the Z-axis direction from an edge of the first portion 16*b*3, and a third portion 16*b*5 extending in the X-axis direction from an edge of the second portion 16*b*4. The third portion 16*b*5 has a connection hole 16*b*1.

As shown in FIG. 7, the edge lead portion 15*b* is drawn out from the coil main portion 12*b* at a draw-out location 15*b*2 disposed at the one side of the coil main portion 12*b* in the X-axis direction. The edge lead portion 15*b* is shifted in the Y-axis direction from the center line L2, opposite the edge lead portion 15*a*.

As shown in FIG. 7, the edge lead portion 15*b* is bent in a crank shape. That is, the edge lead portion 15*b* includes a first portion 15*b*3 drawn out in the X-axis direction from the draw-out location 15*b*2, a second portion 15*b*4 extending upwards in the Z-axis direction from an edge of the first portion 15*b*3, and a third portion 15*b*5 extending in the X-axis direction from an edge of the second portion 15*b*4. The third portion 15*b*5 has a connection hole 15*b*1. The connection hole may be used for connection with, for example, a substrate.

As shown in FIG. 7, the second flat coil 10*b* is connected to the first flat coil 10*a* by connecting the third portion 16*b*5 of the intermediate lead portion 16*b* to the intermediate lead portion 16*a* of the first flat coil 10*a*. The second flat coil 10*b* is disposed so that the connection hole 16*a*1 of the intermediate lead portion 16*a* and the connection hole 16*b*1 of the intermediate lead portion 16*b* communicate with each other. The connection holes may be used for connection with, for example, a substrate.

As shown in FIG. 7, having the intermediate lead portions 16*a* and 16*b* connected, the first flat coil 10*a* and the second flat coil 10*b* constitute the flat coil 10, which is wound two turns and includes the pair of edge lead portions 15*a* and 15*b*. The edge lead portions 15*a* and 15*b* may be connected to, for example, an external circuit. The heat-dissipating portion 18 of the first flat coil 10*a* is not in contact with the second flat coil 10*b*, and a gap having a width W3 is provided between the heat-dissipating portion 18 and the coil main portion 12*b*.

Figure 4:
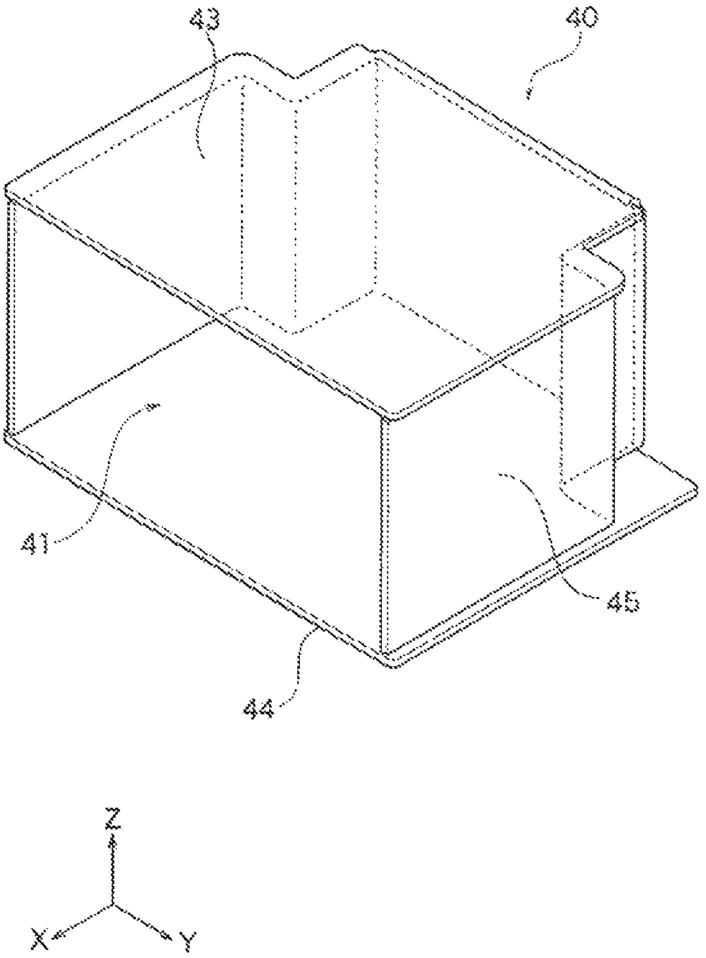
FIG. 4 is a perspective view of a case shown in FIG. 2.

As shown in FIG. 4, the case 40 has an opening 41, which is a plane perpendicular to the X-axis direction. The case 40 may include an upper wall 43 disposed above in the Z-axis direction, a lower wall 44 disposed below in the Z-axis direction, and a side wall 45 disposed in the X-axis and Y-axis directions. The upper wall 43, the lower wall 44, and the side wall 45 may have any shapes. The side wall 45 preferably has, for example, a shape that surrounds the exterior of cores 30*a* and 30*b* and a bobbin 50 along the Z-axis direction shown in FIG. 5. The case 40 is made from, for example, metal (e.g., aluminum) with excellent heat dissipation ability and is preferably formed by, for example, bending a metal plate. However, the case 40 may be made from resin or ceramics with excellent heat dissipation ability.

As shown in FIG. 2, the coil device 1 may include the bobbin 50, and a wire 80 may be wound around the bobbin 50. The bobbin 50 is made from, for example, plastics such as PPS, PET, PBT, LCP, and nylon but may be made from other insulating materials. As the wire 80, for example, a wire made by covering a core material made from a good conductor (e.g., copper; Cu) with an insulation material (e.g., imide-modified polyurethane) and further covering the outermost surface with a thin resin layer (e.g., polyester) may be used. However, a wire having other structures may be used.

Figure 3:
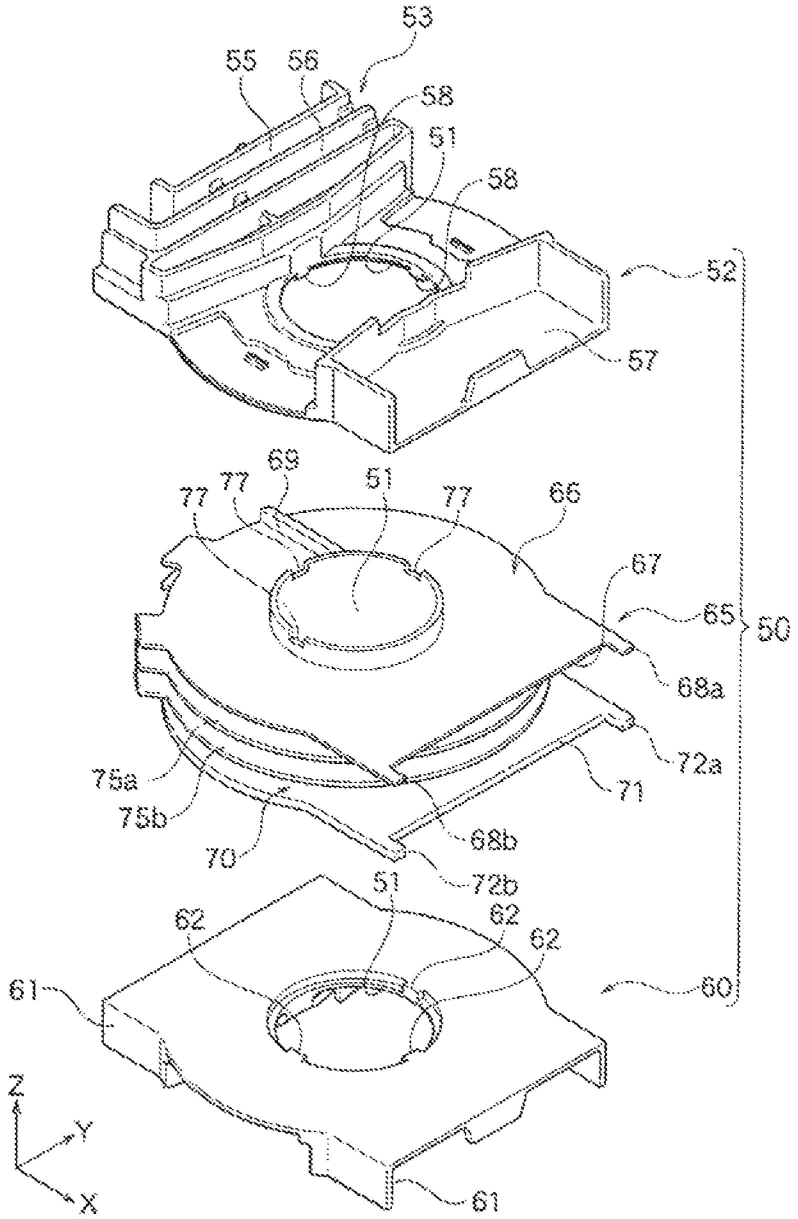
FIG. 3 is an exploded perspective view of a bobbin shown in FIG. 2.

As shown in FIG. 3, the bobbin 50 includes a bobbin body 65, an upper flange 52 attached above the bobbin body 65 in the Z-axis direction, and a lower flange 60 attached below the bobbin body 65 in the Z-axis direction. The bobbin 50 has a through-hole 51 penetrating the upper flange 52, the bobbin body 65, and the lower flange 60 in the Z-axis direction.

As shown in FIG. 3, at an upper part of the bobbin body 65 in the Z-axis direction, the bobbin body 65 includes a body upper flange 66 where the coil main portion 12*a* of the first flat coil 10*a* is attached. The body upper flange 66 includes an insulation projection 69, which prevents a short circuit between the edge lead portion 15*a* and the intermediate lead portion 16*a* when the first flat coil 10*a* shown in FIG. 7 is attached. The insulation projection 69 can be used for positioning the first flat coil 10*a*.

As shown in FIG. 3, the body upper flange 66 includes protrusions 68*a* and 68*b*. The protrusions 68*a* and 68*b* protrude from an edge of the body upper flange 66 in the X-axis direction. Also, the body upper flange 66 has a notch 67. The notch 67 is provided between the protrusions 68*a* and 68*b*.

At a lower part of the bobbin body 65 in the Z-axis direction, the bobbin body 65 includes a body lower flange 70 where the coil main portion 12*b* of the second flat coil 10*b* is attached. Similarly to the body upper flange 66, the body lower flange 70 may include an insulation projection (not shown in the drawings), which prevents a short circuit between the edge lead portion 15*b* and the intermediate lead portion 16*b* when the second flat coil 10*b* shown in FIG. 7 is attached.

As shown in FIG. 3, the body lower flange 70 includes protrusions 72*a* and 72*b*. The protrusions 72*a* and 72*b* protrude from an edge of the body lower flange 70 in the X-axis direction, towards the same direction as the protrusions 68*a* and 68*b* of the body upper flange 66 protrude. Also, the body lower flange 70 has a notch 71. The notch 71 is provided between the protrusions 72*a* and 72*b*.

Figure 8:
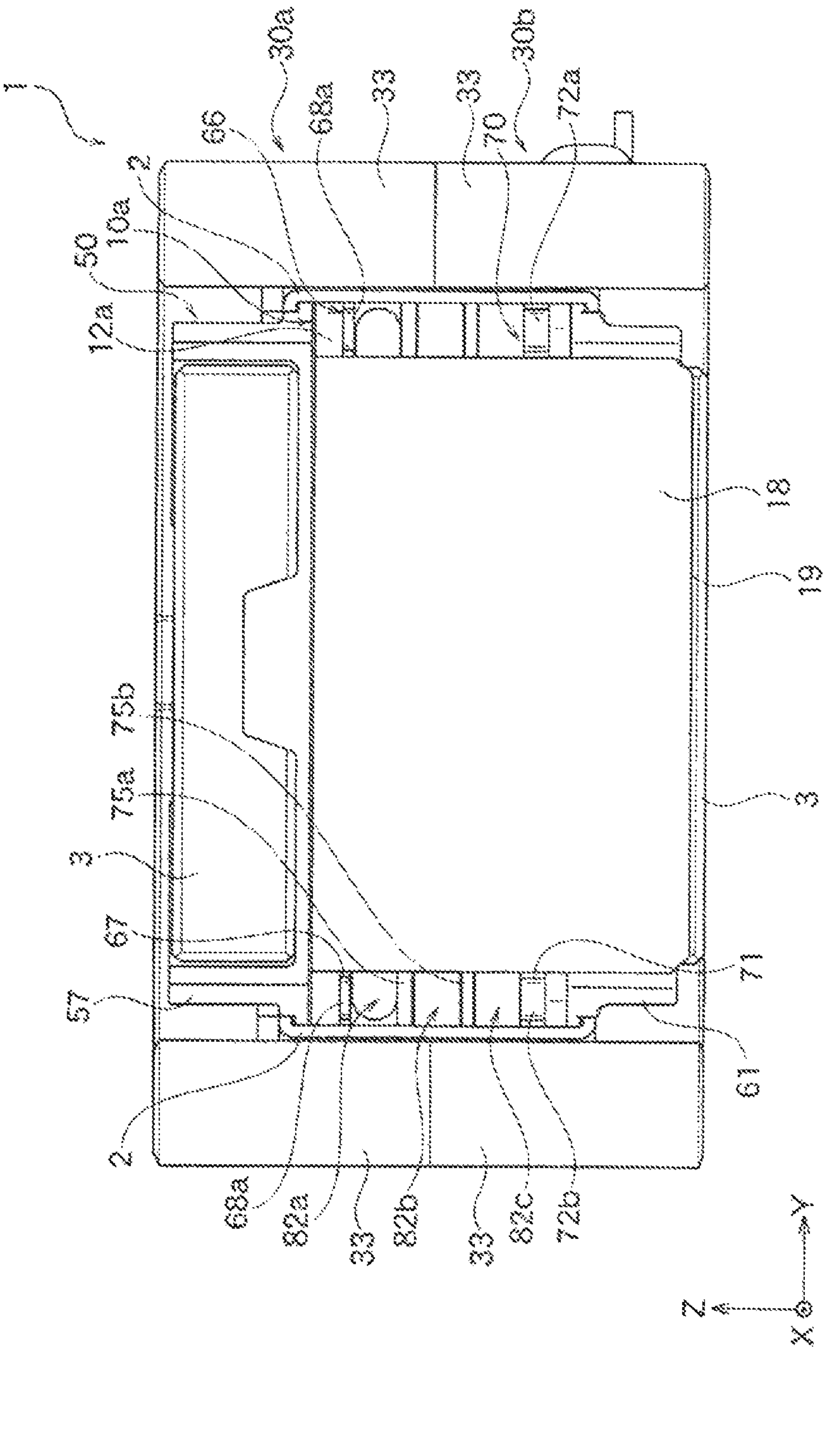
FIG. 8 is a partial rear elevational view of the coil device shown in FIG. 1.

As shown in FIG. 8, the protrusions 68*a* and 72*a* are disposed in alignment along the Z-axis direction. Similarly, the protrusions 68*b* and 72*b* are disposed in alignment along the Z-axis direction. When the first flat coil 10*a* is attached to the bobbin 50, the heat-dissipating portion 18 is disposed in the notches 67 and 71. The protrusions 68*a*, 68*b*, 72*a*, and 72*b* protrude outwards from the heat-dissipating portion 18 in the X-axis direction.

Figure 6:
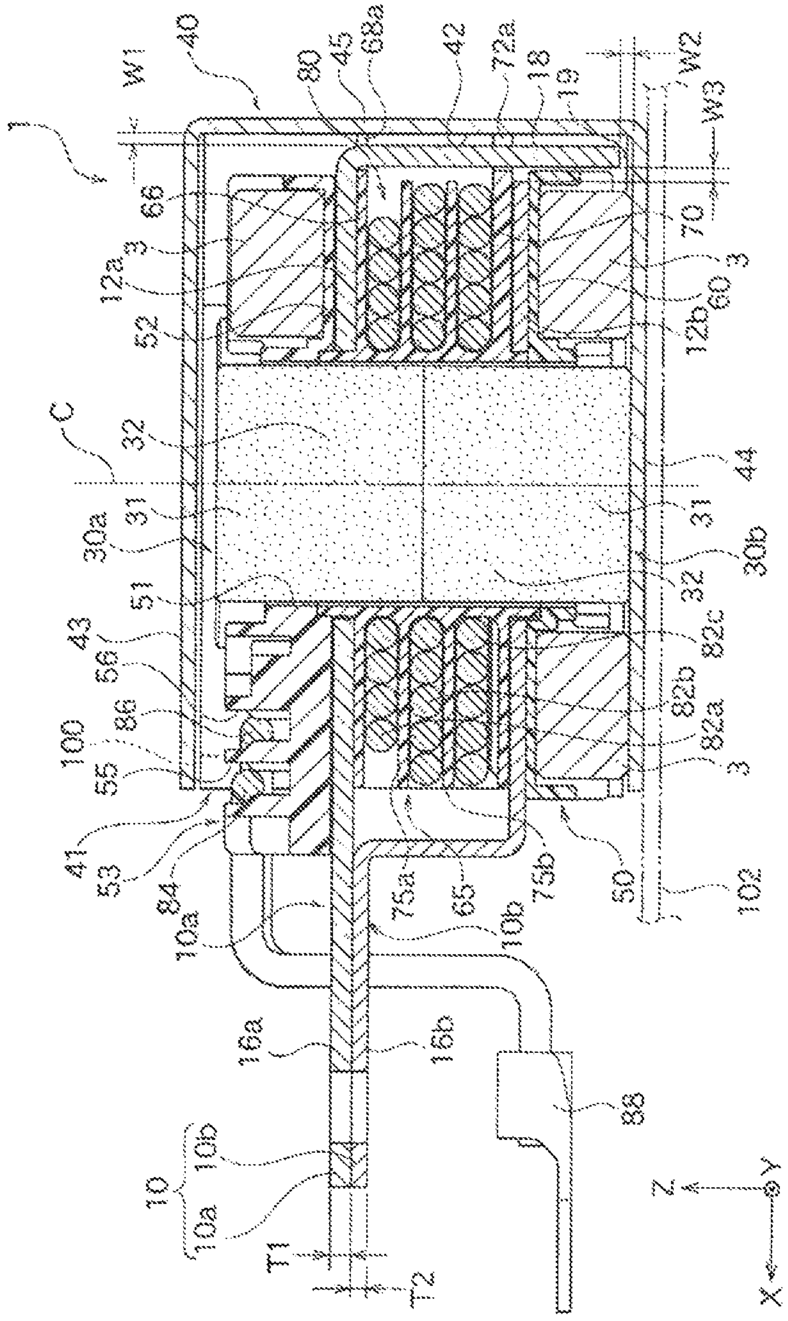
FIG. 6 is a sectional view along line VI-VI shown in FIG. 1.

As shown in FIG. 3, the bobbin body 65 includes intermediate flanges 75*a* and 75*b*. As shown in FIG. 6, the wire 80 can be wound around the bobbin body 65. For example, a wiring portion 82*a* is disposed between the body upper flange 66 and the intermediate flange 75*a*. A wiring portion 82*b* is disposed between the intermediate flanges 75*a* and 75*b*. A wiring portion 82*c* is disposed between the intermediate flange 75*b* and the body lower flange 70.

A method of winding the wire 80 is not limited. For example, the wiring portions 82*a* and 82*b* of the wire 80 may be α-wound, and the wiring portion 82*c* thereof may be normally wound. The number of turns of the wiring portions 82*a*, 82*b*, and 82*c* is not limited. The wiring portions may be wound one turn or multiple turns.

As shown in FIG. 3, the upper flange 52 includes an extending portion 53 at one X-axial end. The extending portion 53 has a first groove 55 and a second groove 56. For example, the first groove 55 and the second groove 56 may extend along the Y-axis. For example, as shown in FIG. 5, a draw-out portion 84 of the wire 80 is disposed in the first groove 55, and a draw-out portion 86 of the wire 80 is disposed in the second groove 56. As the draw-out portions 84 and 86 have external terminals 88 attached to the respective tips of the draw-out portions and are disposed in the grooves 55 and 56, it is possible to freely change draw-out locations and attach the coil device 1 to a substrate 102 or the like.

As shown in FIG. 3, the upper flange 52 includes a block retainer 57 at the other X-axial end. Further, the lower flange 60 includes block retainers 61 at both of the X-axial ends. As shown in FIG. 6, heat-dissipating blocks 3 made from, for example, metal (e.g., aluminum) or other materials with high thermal conductivity may be attached to the respective block retainers 57 and 61.

The upper flange 52 can be attached to the bobbin body 65 by fitting locking pieces 58 of the upper flange 52 into respective locking grooves 77 of the bobbin body 65. As shown in FIG. 6, the upper flange 52 may be attached so that the coil main portion 12*a* of the first flat coil 10*a* is disposed between the upper flange 52 and the body upper flange 66. The first flat coil 10*a* is attached to the bobbin 50, in which the axis C is positioned at the through-hole 51.

Similarly to the upper flange 52, the lower flange 60 can be attached to the bobbin body 65 by fitting locking pieces 62 of the lower flange 60 into respective locking grooves (not shown in the drawings) of the bobbin body 65. As shown in FIG. 6, the lower flange 60 may be attached so that the coil main portion 12*b* of the second flat coil 10*b* is disposed between the lower flange 60 and the body lower flange 70. The second flat coil 10*b* is attached to the bobbin 50, in which the axis C is positioned at the through-hole 51. Also, bobbin covers 2 shown in FIG. 2 may be attached from both sides of the Y-axis direction.

As shown in FIG. 2, the coil device 1 may include the cores 30*a* and 30*b*. Each of the cores 30*a* and 30*b* includes a base portion 31, a middle leg portion 32, and a pair of outer leg portions 33.

The cores 30*a* and 30*b* may be made from any material. They may be made solely from a magnetic material or may be made from a material including a magnetic material and resin. Examples of magnetic materials constituting the cores include ferrites and metal magnetic materials. Examples of ferrites include Mn based ferrites, Ni—Zn based ferrites, and Mn—Zn based ferrites. Examples of metal magnetic materials are not limited and include Fe—Ni alloys, Fe—Si alloys, Fe—Si—Cr alloys, Fe—Co alloys, Fe—Si—Al alloys, and amorphous iron. Examples of resin are not limited and include epoxy resin, phenol resin, polyester resin, polyurethane resin, polyimide resin, other synthetic resin, and other non-magnetic materials. Note that the cores may be sintered bodies of a metal magnetic material.

As shown in FIG. 6, the base portion 31 of the core 30*a* is disposed above the upper flange 52 in the Z-axis direction, and the base portion 31 of the core 30*b* is disposed below the lower flange 60 in the Z-axis direction. The middle leg portions 32 are inserted into the through-hole 51. As shown in FIG. 8, the outer leg portions 33 are disposed outwards from the bobbin covers 2 in the Y-axis direction.

As shown in FIG. 6, the flat coil 10, the bobbin 50, the wire 80, the cores 30*a* and 30*b*, and the heat-dissipating blocks 3 are accommodated in the case 40. The case 40 is filled with a heat-dissipating resin 100. The heat-dissipating resin 100 may be in contact with the flat coil 10, the bobbin 50, the wire 80, the cores 30*a* and 30*b*, and the heat-dissipating blocks 3.

As shown in FIG. 6, the protrusion 68*a* (68*b*) of the body upper flange 66 and the protrusion 72*a* (72*b*) of the body lower flange 70 may be in contact with the side wall 45 extending along the Y-axis direction. When the protrusions 68*a*, 68*b*, 72*a*, and 72*b* are in contact with the side wall 45, a gap having a width W1 is provided between the side wall 45 extending along the Y-axis direction and the heat-dissipating portion 18, and a gap having a width W2 is provided between an end 19 of the heat-dissipating portion 18 and the lower wall 44.

The widths W1 and W2 are not limited. The narrower the widths W1 and W2, the higher the efficiency of heat dissipation from the heat-dissipating portion 18 to the case 40 via the heat-dissipating resin 100. With the predetermined widths W1 and W2, the case 40 and the flat coil 10 are kept insulated in the coil device 1. Note that, when the case 40 is an insulating case made from resin or the like, the case may be disposed so as to be in contact with the flat coil without the gaps having the widths W1 and W2 being provided, and heat may be dissipated directly from the heat-dissipating portion to the case. Also, the gap having the width W3 is provided between the heat-dissipating portion 18 and the coil main portion 12*b*. The width W3 is not limited and is preferably so wide that a short circuit between the coil main portions 12*a* and 12*b* is prevented.

When the first flat coil 10*a* is disposed farther from the lower wall 44 of the case 40 as shown in FIG. 6, the first flat coil 10*a* readily reaches a higher temperature in the coil device 1. The first flat coil 10*a* includes the heat-dissipating portion 18, which meets the coil main portion 12*a* at the predetermined angle, and can dissipate heat generated at the flat coil via this heat-dissipating portion 18. This improves the heat dissipation ability of the flat coil.

As shown in FIG. 6, the flat plate constituting the first flat coil 10*a* may have any thickness T1. The thickness T1 may be larger than the thickness T2 of the flat plate constituting the second flat coil 10*b*. The thickness T1 of the first flat coil 10*a*, which readily reaches a high temperature, is preferably at least 1.1 times the thickness T2 of the second flat coil 10*b*, preferably at least 1.2 times the thickness T2, or particularly preferably at least 1.3 times the thickness T2. As the thickness T1 of the first flat coil 10*a* is about 1.3 times the thickness T2 of the second flat coil 10*b*, the heat dissipation ability can be further improved.

The predetermined angle at which the heat-dissipating portion 18 meets the coil main portion 12*a* is not limited. For example, as shown in FIG. 6, the heat-dissipating portion 18 may be disposed so that it runs along the flat coil 10 in the Z-axis direction (i.e., so that the predetermined angle is substantially 90°). When the heat-dissipating portion 18 is disposed along the Z-axis direction, the heat-dissipating portion 18 faces the side wall 45 of the case 40. Thus, the heat-dissipating ability is improved, and a smaller size can be achieved.

As shown in FIG. 7, the heat-dissipating portion 18 may be disposed at one side of the X-axis direction, and the lead portion 14*a* may be disposed at the other side of the X-axis direction. That is, the heat-dissipating portion 18 may be disposed opposite the lead portion 14*a*, with the coil main portion 12*a* therebetween. As the heat-dissipating portion 18 is disposed in this manner, heat generated at the flat coil can be dissipated outside the coil device more effectively.

As shown in FIG. 7, the second flat coil 10*b* may include heat-dissipating portions 18*a* and 18*a*. The heat-dissipating portions 18*a* and 18*a* of the second flat coil 10*b* can improve the heat dissipating ability similarly to the heat-dissipating portion 18 of the first flat coil 10*a*.

As shown in FIG. 1, the coil device 1 includes the heat-dissipating resin 100 with which the case 40 is filled. Note that the case 40 may be made from metal, resin, or a composite material including metal and resin and is preferably made from a material with high thermal conductivity. The heat-dissipating resin 100 is, for example, potting resin and may be composed of silicone resin, urethane resin, epoxy resin, etc.

In the coil device 1, the flat coil 10 is covered by the case 40 and is immersed in the heat-dissipating resin 100. Thus, heat generated at the flat coil 10 is readily transferred from the heat-dissipating portion 18 to the case 40 via the heat-dissipating resin 100. Dissipation of heat via the case 40 improves the heat dissipating ability of the coil device 1.

As shown in FIG. 6, in the coil device 1, the wire 80 may be wound between the coil main portion 12*a* of the first flat coil 10*a* and the coil main portion 12*b* of the second flat coil 10*b*. In the coil device 1, it is possible to increase the coupling coefficient between the flat coil and the wire winding type coil and efficiently dissipate heat from these coils.

As shown in FIG. 6, in the coil device 1, the heat-dissipating portion 18 of the first flat coil 10*a* may include the end 19, which is closer to the lower wall 44 of the case 40 than is the coil main portion 12*b* of the second flat coil 10*b*.

As the end 19 of the heat-dissipating portion 18 is close to the lower wall 44 of the case 40 as shown in FIG. 6, heat generated at the first flat coil 10*a*, which is disposed farther from the lower wall 44 and readily reaches a higher temperature, can be efficiently dissipated from the heat-dissipating portion 18 to the lower wall 44 via the heat-dissipating resin 100. For example, when the coil device 1 is attached to the substrate 102 equipped with a cooling system or the like so that the lower wall 44 is in contact with the substrate 102 as shown in FIG. 6, heat can be particularly efficiently dissipated from the coil device 1.

In the coil device 1 shown in FIG. 1, the temperature of the first flat coil 10*a*, which reaches the highest temperature, can be reduced specifically by 5% or more or by more suitably 10% or more compared to when a coil device including a flat coil that does not have a heat-dissipating portion is used under the same conditions.

As shown in FIG. 1, the coil device 1 may include the bobbin 50 provided with the flat coil 10, and the cores 30*a* and 30*b* disposed along the axis C of the flat coil 10. Despite the coil device 1 including the cores 30*a* and 30*b*, heat generated at the cores 30*a* and 30*b* can also be dissipated outside the case 40. Other than the flat coil, for example, the wire 80 can be wound around the bobbin of the coil device.

As shown in FIG. 1, the case 40 may have the opening 41 at a side of the case. When the case 40 has the opening 41 at the side of the case (e.g., deep in the X-axis direction), the lead portions 14*a* and 14*b* can be drawn out outside the case 40 from the lateral side of the case 40 through the opening 41, and a need for drawing out the lead portions 14*a* and 14*b* outside the case 40 from an upper part of the case 40 in the Z-axis direction is eliminated. Consequently, a need for an upper part of the bobbin 50 to protrude outwards from the case 40 for the purpose of positioning or the like is eliminated, which can reduce the height of the bobbin 50 by the amount of the eliminated protrusion. Thus, the height of the coil device 1 can be reduced.

As shown in FIG. 6, the heat-dissipating portion 18 may be disposed along the side wall 45 of the case 40 and apart from the side wall 45. The heat-dissipating resin 100 is in contact with the case 40 and the heat-dissipating portion 18. As the heat-dissipating portion 18 is disposed along the side wall 45 of the case 40, and the heat-dissipating resin 100 is disposed between the side wall 45 and the lower wall 44, heat is more readily transferred from the heat-dissipating portion 18 to the case 40 via the heat-dissipating resin 100. As the heat-dissipating resin 100, the heat-dissipating portion 18, and the case 40 are disposed in this manner, heat generated at the flat coil 10 is readily transferred from the heat-dissipating portion 18 to the case 40 via the heat-dissipating resin 100.

As shown in FIG. 3, the bobbin 50 may include the protrusions 68*a* and 68*b*. Also, as shown in FIG. 5, the bobbin 50 may have the notch 67 where the heat-dissipating portion 18 is disposed. The protrusions 68*a* and 68*b* enable the heat-dissipating portion 18 to be apart from the side wall 45 of the case 40 as shown in FIG. 6.

The protrusions 68*a* and 68*b* can ensure insulation between the heat-dissipating portion 18 and the side wall 45. As the heat-dissipating portion 18 is disposed in the notch 67, a short circuit between the heat-dissipating portion 18 and the case 40 can be more effectively prevented. As the heat-dissipating portion 18 is disposed close to the side wall 45 while insulation between the heat-dissipating portion 18 and the side wall 45 is ensured in this manner, heat can be more efficiently dissipated from the heat-dissipating portion 18 to the side wall 45.

As shown in FIG. 3, the bobbin 50 may include the extending portion 53 partly exposed from the heat-dissipating resin 100. When the wire 80 is wound around the bobbin 50 as shown in FIG. 1, the draw-out portions 84 and 86 drawn from the wiring portions 82*a*, 82*b*, and 82*c* can be drawn out in a desired direction (direction along the Y-axis in FIG. 1) while being anchored to the extending portion 53 of the bobbin 50.

As shown in FIG. 6, the heat-dissipating blocks 3 attached via insulating walls partly constituting the flanges 52 and 60 of the bobbin 50 may be provided near the flat coil 10. Heat is readily transferred to the heat-dissipating blocks 3, and heat from the flat coil can be more efficiently dissipated. In particular, as one of the heat-dissipating blocks 3 is disposed near the first flat coil 10*a*, which readily reaches a high temperature, heat is more efficiently dissipated. As the upper wall 43 of the case 40 is disposed above the heat-dissipating block 3 above the first flat coil 10*a* in the Z-axis direction as shown in FIG. 6, heat is more efficiently dissipated.

Specifically, in the coil device 1 shown in FIG. 1, the temperature of the first flat coil 10*a*, which reaches the highest temperature, can be reduced by 2% or more compared to when a coil device that does not include a heat-dissipating block is used under the same conditions.

Second Embodiment

Figure 10:
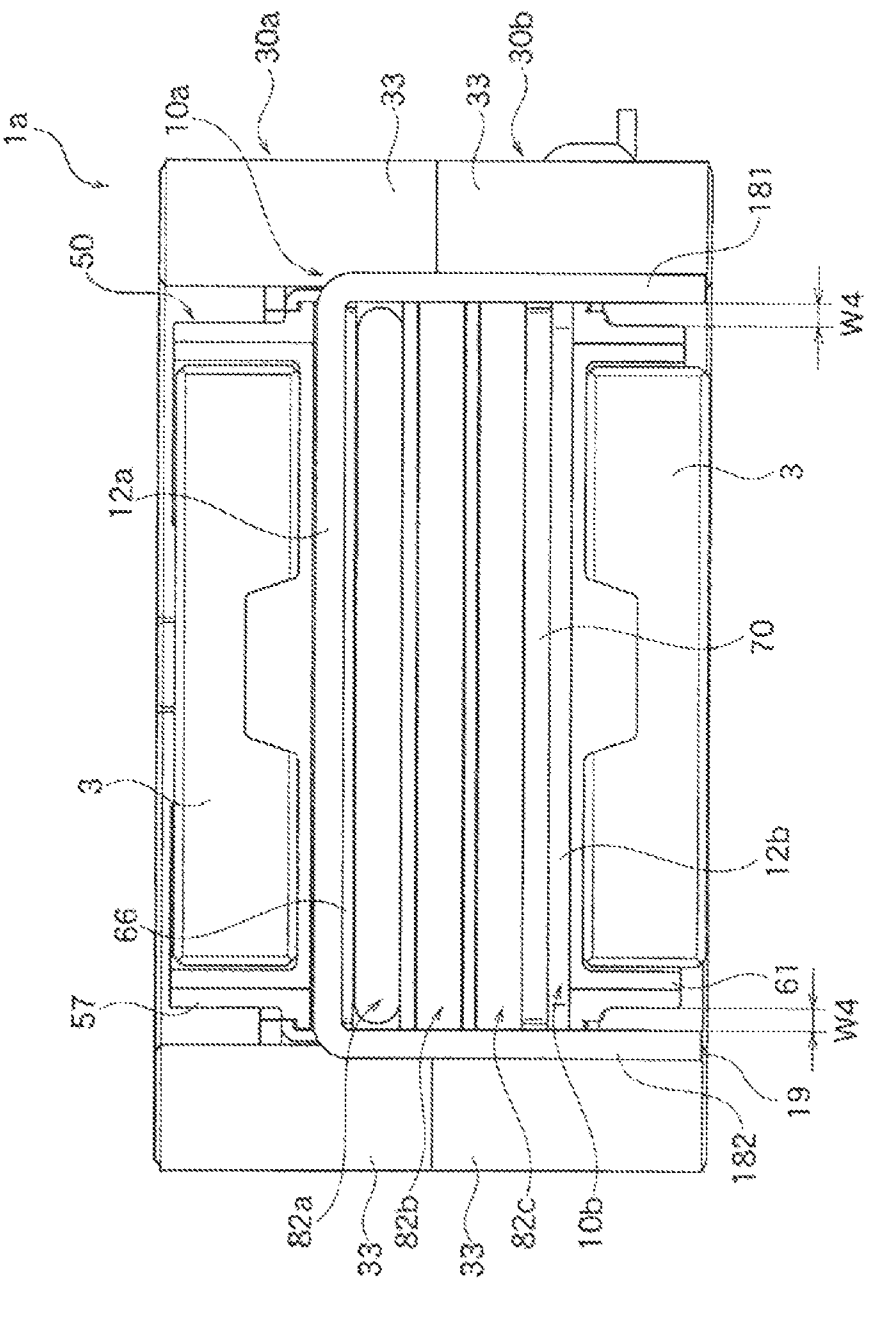
FIG. 10 is a partial rear elevational view of a coil device according to the another embodiment.

Hereinafter, a coil device 1*a* shown in FIG. 10 is described. Description common to the first embodiment is omitted, and mainly what is different from the first embodiment is described in detail. What is not described in the following description is similar to the first embodiment. Mainly the structure of a first flat coil 10*a* of the coil device 1*a* is different from that of the coil device 1 shown in FIG. 1.

Figure 9:
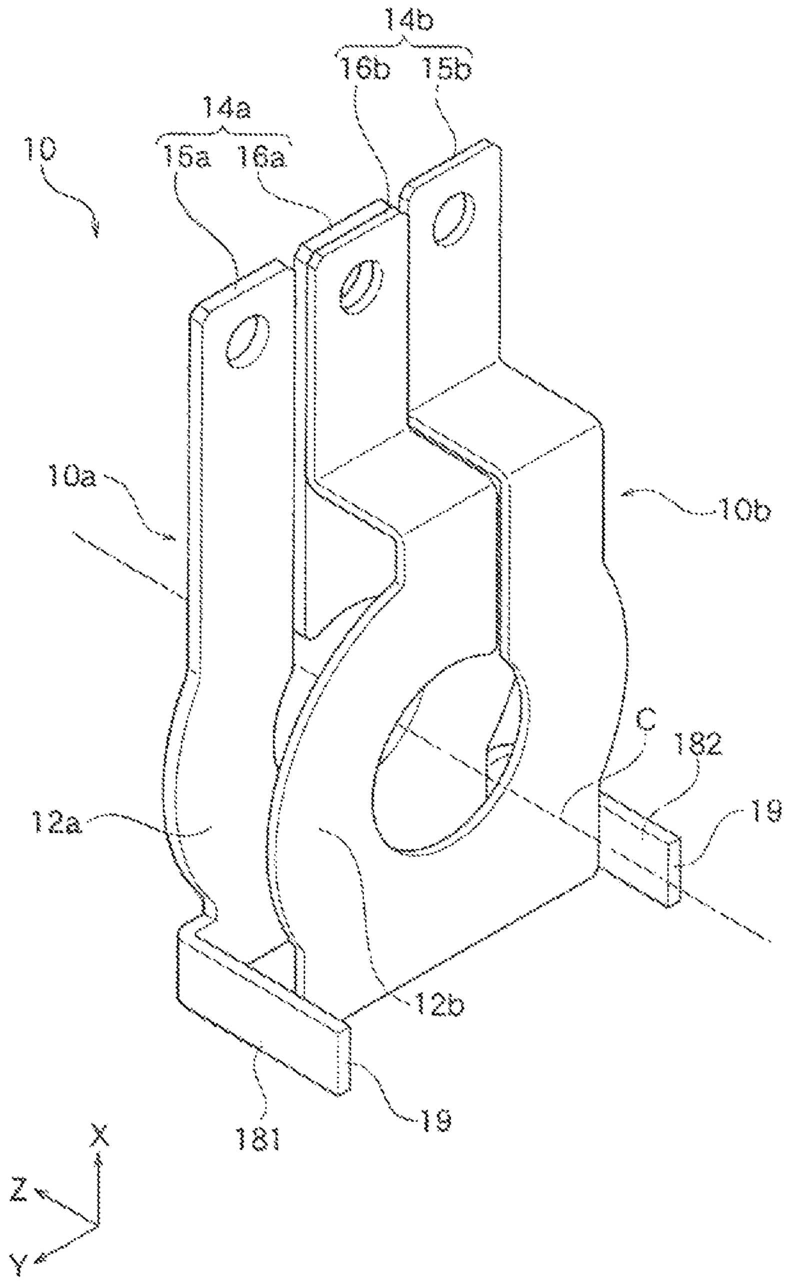
FIG. 9 is a perspective view of a flat coil according to another embodiment.

The coil device 1*a* includes the first flat coil 10*a* shown in FIG. 9. As shown in FIG. 9, the first flat coil 10*a* of the present embodiment includes heat-dissipating portions 181 and 182. The heat-dissipating portions 181 and 182 extend downwards in the Z-axis direction from both sides of the coil main portion 12*a* in the Y-axis direction. As shown in FIG. 10, the heat-dissipating portions 181 and 182 are not in contact with the coil main portion 12*b* of the second flat coil 10*b* and are disposed apart therefrom at a predetermined gap having a width W4. The width W4 may be the same as the width W3 of the first embodiment.

Third Embodiment

Figure 11:
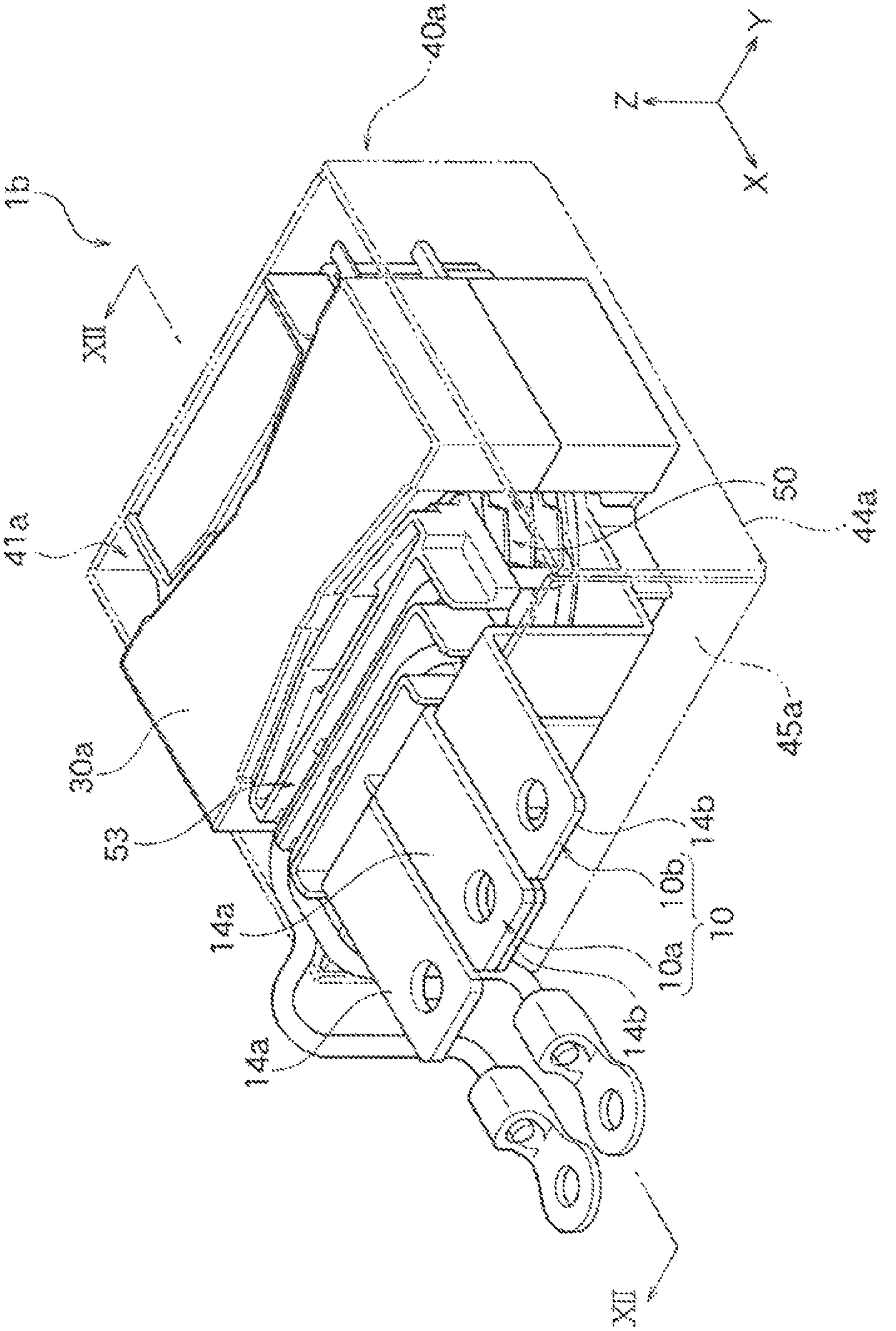
FIG. 11 is an overall perspective view of a coil device according to a still another embodiment.

Hereinafter, a coil device 1*b* shown in FIG. 11 is described. Description common to the first embodiment is omitted, and mainly what is different from the first embodiment is described in detail. What is not described in the following description is similar to the first embodiment. Mainly the structure of a case 40*a* of the coil device 1*b* is different from that of the case 40 of the coil device 1 shown in FIG. 1.

As shown in FIG. 11, the case 40*a* has an opening 41 at the top of the case, deep in the Z-axis direction. The case 40*a* includes a lower wall 44*a* disposed below and a side wall 45*a* having a normal that is substantially perpendicular to the Z-axis direction. The lower wall 44*a* and the side wall 45*a* may have any shapes. The side wall 45*a* may constitute, for example, walls perpendicular to the X-axis and walls perpendicular to the Y-axis.

Figure 13:
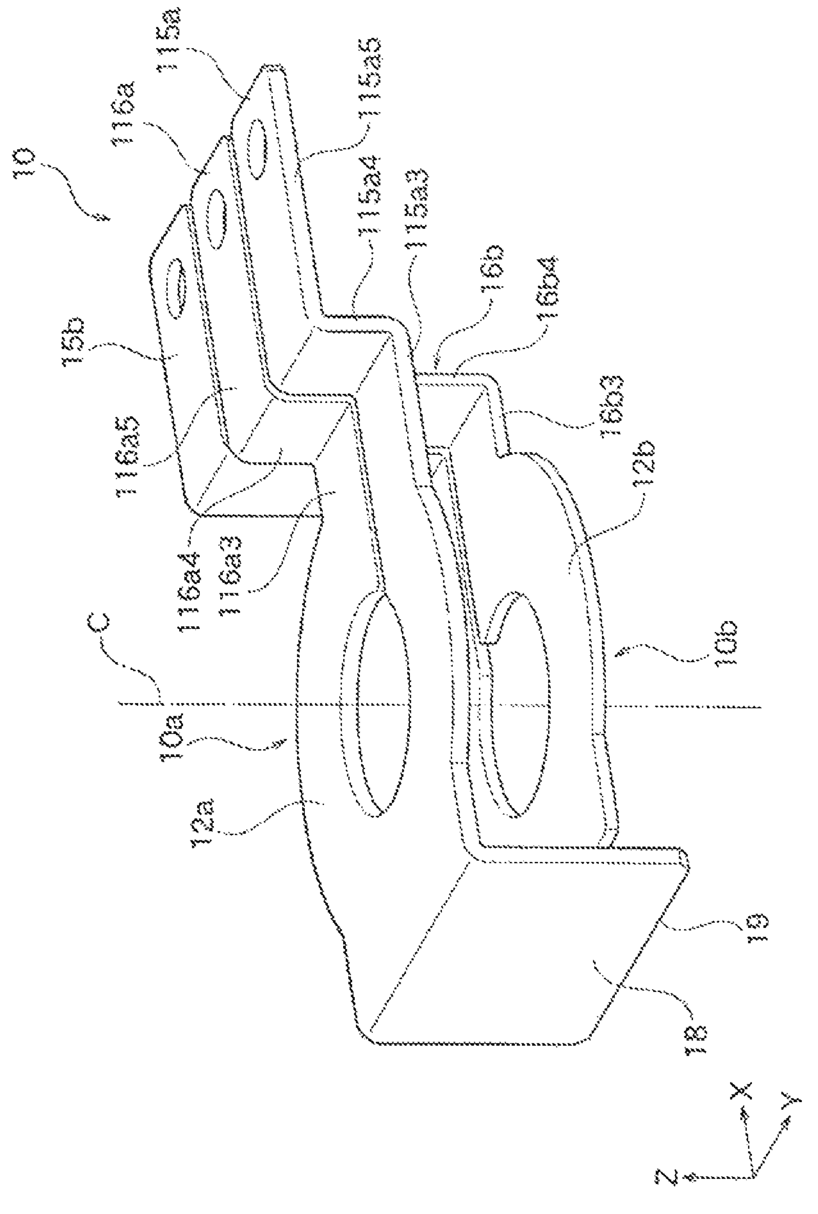
FIG. 13 is a perspective view of a flat coil of the coil device shown in FIG. 11.

As shown in FIG. 13, the structure of a first flat coil 10*a* of the coil device 1*b* is different from that of the coil device 1. The first flat coil 10*a* of the present embodiment includes an edge lead portion 115*a* and an intermediate lead portion 116*a*.

As shown in FIG. 13, the edge lead portion 115*a* is bent in a crank shape. That is, the edge lead portion 115*a* includes a first portion 115*a*3 drawn out in the X-axis direction from the coil main portion 12*a*, a second portion 115*a*4 extending upwards in the Z-axis direction from an edge of the first portion 115*a*3, and a third portion 115*a*5 extending in the X-axis direction from an edge of the second portion 115*a*4.

As shown in FIG. 13, the intermediate lead portion 116*a* is bent in a crank shape. That is, the intermediate lead portion 116*a* includes a first portion 116*a*3 drawn out in the X-axis direction from the coil main portion 12*a*, a second portion 116*a*4 extending upwards in the Z-axis direction from an edge of the first portion 116*a*3, and a third portion 116*a*5 extending in the X-axis direction from an edge of the second portion 116*a*4.

Figure 12:
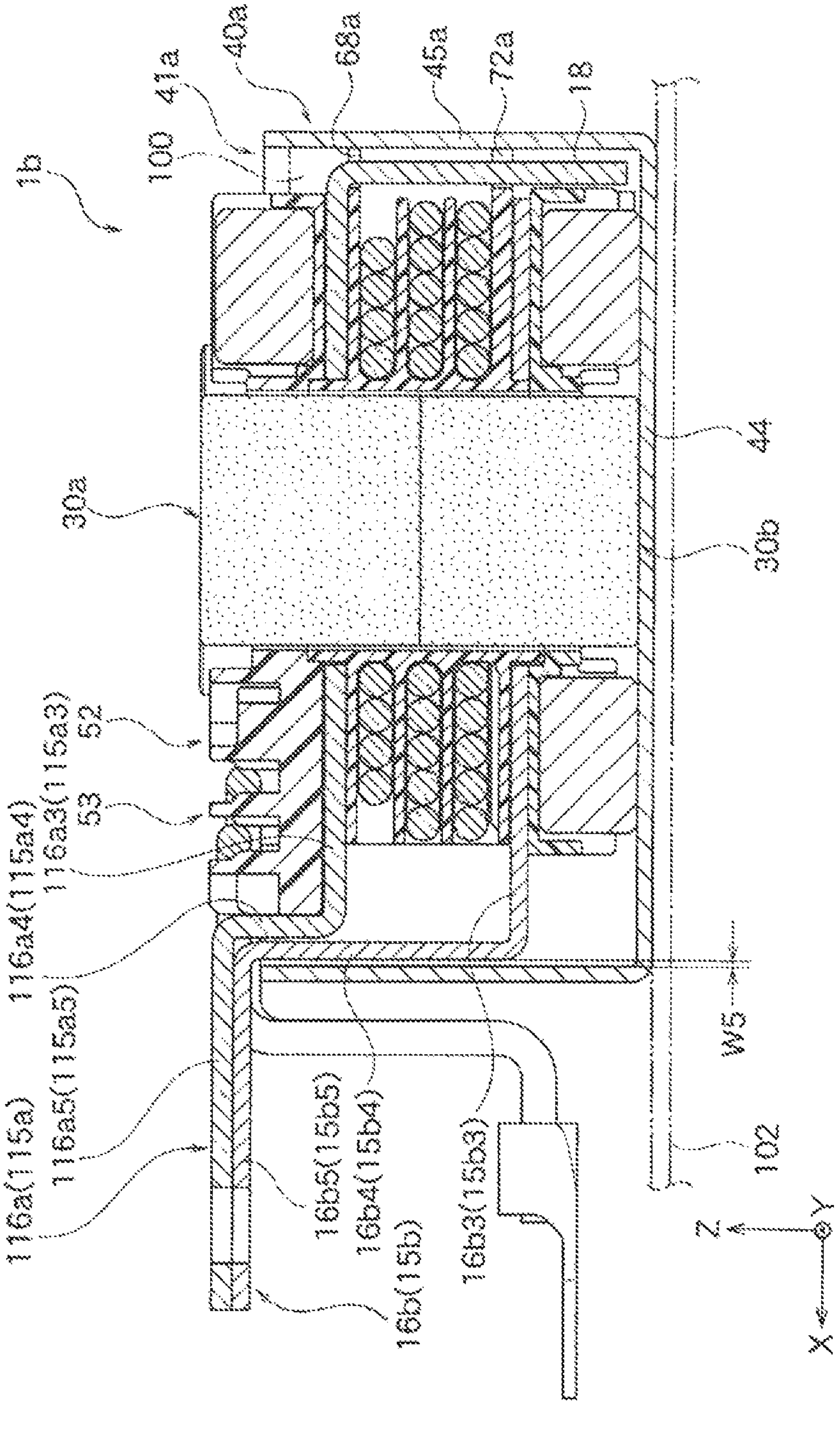
FIG. 12 is a sectional view along line XII-XII shown in FIG. 11.

As shown in FIG. 12, the intermediate lead portion 116*a* is disposed so that the third portion 116*a*5 is located above the side wall 45*a* of the case 40*a* in the Z-axis direction. Similarly to the intermediate lead portion 116*a*, the edge lead portion 115*a* is disposed so that the third portion 115*a*5 is located above the side wall 45*a* of the case 40*a* in the Z-axis direction.

As shown in FIG. 12, a gap having a width W5 is provided between the side wall 45*a* and the respective second portions 16*b*4 and 15*b*4 of the intermediate lead portion 16*b* and the edge lead portion 15*b*. The width W5 may be the same as the width W2 of the first embodiment.

Variously modified forms, shapes, etc. within the scope of the claims are included in the technical scopes of the above-mentioned embodiments.

REFERENCE NUMERALS

1, 1*a*, 1*b* . . . coil device
10 . . . flat coil
10*a* . . . first flat coil
12*a* . . . coil main portion
14*a* . . . lead portion
15*a*, 115*a* . . . edge lead portion
15*a*1 . . . connection hole
15*a*2 . . . draw-out location
115*a*3 . . . first portion
115*a*4 . . . second portion
115*a*5 . . . third portion
16*a*, 116*a* . . . intermediate lead portion
16*a*1 . . . connection hole
16*a*2 . . . draw-out location
116*a*3 . . . first portion
116*a*4 . . . second portion
116*a*5 . . . third portion
18, 181, 182 . . . heat-dissipating portion
19 . . . end
10*b* . . . second flat coil
12*b* . . . coil main portion
14*b* . . . lead portion
15*b* . . . edge lead portion
15*b*1 . . . connection hole
15*b*2 . . . draw-out location
15*b*3 . . . first portion
15*b*4 . . . second portion
15*b*5 . . . third portion
16*b* . . . intermediate lead portion
16*b*1 . . . connection hole
16*b*2 . . . draw-out location
16*b*3 . . . first portion
16*b*4 . . . second portion
16*b*5 . . . third portion
18*a* . . . heat-dissipating portion
30*a*, 30*b* . . . core
31 . . . base portion
32 . . . middle leg portion
33 . . . outer leg portion
40, 40*a* . . . case
41, 41*a* . . . opening
43 . . . upper wall
44, 44*a* . . . lower wall
45, 45*a* . . . side wall
50 . . . bobbin
51 . . . through-hole

52 . . . upper flange
53 . . . extending portion
55 . . . first groove
56 . . . second groove
57 . . . block retainer
58 . . . locking piece
60 . . . lower flange
61 . . . block retainer
62 . . . locking piece
65 . . . bobbin body
66 . . . body upper flange
67 . . . notch
68*a*, 68*b* . . . protrusion
69 . . . insulation projection
70 . . . body lower flange
71 . . . notch
72*a*, 72*b* . . . protrusion
75*a*, 75*b* . . . intermediate flange
77 . . . locking groove
80 . . . wire
82*a*, 82*b*, 82*c* . . . wiring portion
84, 86 . . . draw-out portion
88 . . . external terminal
100 . . . heat-dissipating resin
102 . . . substrate
2 . . . bobbin cover
3 . . . heat-dissipating block

What is claimed is:

1. A flat coil comprising:
a coil main portion having a flat shape;
a lead portion drawn out from the coil main portion; and
a heat-dissipating portion provided to the coil main portion at a location different from where the lead portion is drawn out from the coil main portion, the heat-dissipating portion meeting the coil main portion at a predetermined angle.

2. A coil device comprising:
the flat coil according to claim 1;
a case accommodating the flat coil; and
a heat-dissipating resin in the case.

3. The coil device according to claim 2, comprising:
a bobbin provided with the flat coil; and
a core disposed along an axis of the flat coil,
wherein the case has an opening at a side of the case.

4. The coil device according to claim 2, comprising:
a bobbin provided with the flat coil; and
a core disposed along an axis of the flat coil,
wherein the case has an opening at a top of the case.

5. The coil device according to claim 2, wherein the heat-dissipating portion is disposed opposite the lead portion, with the coil main portion therebetween.

6. The coil device according to claim 2, wherein the heat-dissipating portion is disposed along a side wall of the case and apart from the side wall.

7. The coil device according to claim 2, wherein the heat-dissipating resin is in contact with the case and the heat-dissipating portion.

8. The coil device according to claim 2, wherein
the flat coil comprises a first flat coil including the heat-dissipating portion and a second flat coil connected to a lead portion of the first flat coil; and
a coil main portion of the second flat coil is disposed to face a coil main portion of the first flat coil, with a distance therebetween.

9. The coil device according to claim 8, wherein the heat-dissipating portion comprises an end that is closer to a lower wall of the case than is the coil main portion of the second flat coil.

10. The coil device according to claim 3, wherein the bobbin comprises a protrusion enabling the heat-dissipating portion to be apart from a side wall of the case.

11. The coil device according to claim 3, wherein the bobbin comprises a notch where the heat-dissipating portion is disposed.

12. The coil device according to claim 3, wherein the bobbin comprises an extending portion partly exposed from the heat-dissipating resin.

13. The coil device according to claim 2 comprising a heat-dissipating block attached near the flat coil via an insulating wall.

14. The coil device according to claim 13, wherein the insulating wall comprises a flange of the bobbin.

* * * * *